(12) United States Patent
Kim et al.

(10) Patent No.: US 12,503,602 B2
(45) Date of Patent: Dec. 23, 2025

(54) ASPHALT MODIFIER FOR ASPHALT MIXTURE AND ASPHALT MIXTURE CONTAINING THE SAME

(71) Applicants: ESG Industry Co., Ltd., Daejeon (KR); ESG Construction Co., Ltd., Gyeryong-si (KR)

(72) Inventors: Hyeong Su Kim, Daejeon (KR); Chan Heum Yeon, Daejeon (KR); Soon Hun Park, Wonju-si (KR); Hyong Ho Nam, Daejeon (KR); Su Ran Kim, Daejeon (KR); Ji Hwan Park, Daejeon (KR); Seung Hoon Shin, Daejeon (KR); Young Suk Kim, Cheongju-si (KR)

(73) Assignees: ESG INDUSTRY CO., LTD., Deajeon (KR); ESG CONSTRUCTION CO., LTD., Gyeryong-si (KR)

(*) Notice: Subject to any disclaimer, the term of this patent is extended or adjusted under 35 U.S.C. 154(b) by 182 days.

(21) Appl. No.: 18/454,623

(22) Filed: Aug. 23, 2023

(65) Prior Publication Data
US 2023/0407095 A1    Dec. 21, 2023

Related U.S. Application Data

(63) Continuation-in-part of application No. 17/505,149, filed on Oct. 19, 2021, now abandoned.

(30) Foreign Application Priority Data
Dec. 11, 2020    (KR) ........................ 10-2020-0173516

(51) Int. Cl.
    *C08L 95/00*      (2006.01)
    *C08K 7/14*       (2006.01)
    (Continued)

(52) U.S. Cl.
    CPC ................ *C08L 95/00* (2013.01); *C08K 7/14* (2013.01); *C08K 9/08* (2013.01); *C08L 23/06* (2013.01);
    (Continued)

(58) Field of Classification Search
    CPC ....................................... C08L 95/00
    See application file for complete search history.

(56) References Cited

U.S. PATENT DOCUMENTS

| | | |
|---|---|---|
| 2,771,387 A | 11/1956 | Kleist et al. |
| 5,021,510 A | 6/1991 | Vroomans |

(Continued)

FOREIGN PATENT DOCUMENTS

| | | |
|---|---|---|
| CN | 106103375 A | 11/2016 |
| CN | 111234439 A | 6/2020 |

(Continued)

OTHER PUBLICATIONS

KPION Machine Translation of KR 10-1925512 (Year: 2025).*

(Continued)

*Primary Examiner* — Alexandra M Moore
(74) *Attorney, Agent, or Firm* — CANTOR COLBURN LLP

(57) ABSTRACT

Provided is an asphalt modifier for an asphalt mixture and an asphalt mixture containing the same, and more particularly, to an asphalt modifier in which a coating layer containing low-melting-point polyethylene and an inorganic material is formed on a reinforcing fiber bundle. Preferably, the asphalt modifier according to the present disclosure is intended to be mixed with aggregate and an asphalt binder, and comprises: a reinforcing fiber bundle having a length of 8 to 34 mm and composed of a plurality of reinforcing fiber strands; and a (Continued)

coating layer forming the envelope of the reinforcing fiber bundle and comprising polyethylene and an inorganic material.

3 Claims, 3 Drawing Sheets

(51) Int. Cl.
    *C08K 9/08*     (2006.01)
    *C08L 23/06*     (2006.01)

(52) U.S. Cl.
    CPC .. *C08K 2201/004* (2013.01); *C08L 2207/066* (2013.01); *C08L 2555/50* (2013.01); *C08L 2555/86* (2013.01)

(56) References Cited

U.S. PATENT DOCUMENTS

| | | | |
|---|---|---|---|
| 5,660,915 | A | 8/1997 | Schoeps et al. |
| 9,944,797 | B2 | 4/2018 | Yoo et al. |

FOREIGN PATENT DOCUMENTS

| | | | |
|---|---|---|---|
| GB | 1059469 | 2/1967 | |
| KR | 101123783 | 3/2012 | |
| KR | 101427375 | 8/2014 | |
| KR | 101491407 | 2/2015 | |
| KR | 101494799 | 2/2015 | |
| KR | 101589022 | 1/2016 | |
| KR | 101659727 | 9/2016 | |
| KR | 101925512 B1 * | 12/2018 | ............. E01C 7/182 |
| KR | 102261240 | 6/2021 | |
| NL | 1179376 | 1/1970 | |

OTHER PUBLICATIONS

Chinese Office Action—Chinese Application No. 202180037434.7 issued on Nov. 17, 2023, citing CN111234439 and CN106103375.

International Search Report—PCT/KR2021/014210 dated Jan. 25, 2022.

Korean Office Action—Korean Application No. 10-2020-0173516 issued on Mar. 14, 2021, citing KR 10-1589022, KR 10-1491407, and KR 10-1427375.

* cited by examiner

ASPHALT MODIFIER FOR ASPHALT MIXTURE AND ASPHALT MIXTURE CONTAINING THE SAME

BACKGROUND

1. Technical Field

The present disclosure relates to an asphalt modifier for an asphalt mixture and an asphalt mixture containing the same, and particularly, to an asphalt modifier in which a coating layer containing low-density polyethylene, linear low-density polyethylene and an inorganic material is formed on a reinforcing fiber bundle.

2. Related Art

For road pavement, cement concrete pavement or asphalt concrete (Ascon) pavement is mainly used.

Cement concrete pavement refers to a pavement constructed by placing cement concrete plates over a road bed composed of granular materials such as crushed stone. In particular, the cement concrete pavement is frequently used because of its good flexibility for heavy vehicles and its long service life. However, the cement concrete pavement has disadvantages in that the concrete curing time is long and a process such as joint installation is complicated. In addition, it has problems in that the periodic maintenance and repair of the joints are required, the time for the maintenance and repair is long, and the costs for the maintenance and repair are also high. In addition, the cement concrete pavement is hardly applied to urban roads with much traffic, due to problems such as noise and poor riding comfort caused by the joints, and the use of the cement concrete pavement in highways is also gradually decreasing.

Meanwhile, asphalt pavement refers to a road pavement constructed by paving the road surface with an asphalt mixture. The asphalt pavement has disadvantages over the cement concrete pavement in that it has low flexibility for heavy vehicles, and plastic deformation, cracks, potholes and the like occur frequently. In addition, it has problems that the service life thereof is short and frequent maintenance and repair thereof are required. However, asphalt pavement is used in many applications, including urban roads, because it is constructed quickly and simply and the costs for the maintenance and repair thereof are low. The asphalt concrete pavement accounts for more than 90% of road pavement.

To increase the service life of the asphalt pavement and to prevent cracks and plastic deformation of the asphalt pavement, various methods have been used. One of these methods is a method of either using a high-viscosity asphalt binder modified with a polymer, or using an asphalt mixture containing a reinforcing fiber obtained by mixing two or more fibers selected from among carbon fiber, glass fiber, aramid fiber, polyester fiber, and the like. However, the reinforcing fiber obtained by mixing two or more fibers has a problem in that fiber aggregation (fiber balling) occurs during the production of an asphalt mixture. This phenomenon may interfere with the use of the reinforcing fiber.

To solve this problem, various methods have been proposed. Korean Patent No. 10-1494799 discloses a fiber reinforcement in the form of pellets composed of glass fiber scrap coated with an envelope made of an asphalt binder, and a rod-shaped fiber reinforcement composed of a glass fiber bundle coated with a polypropylene resin. In addition, Korea Patent No. 10-1659727 discloses producing pellets for modified asphalt by mixing inorganic continuous fiber or inorganic discontinuous fiber uniformly with a thermoplastic resin and extruding the mixture in the form of pellets.

However, the above patents have disadvantages in that the production process is complicated and the cost is high, because the process comprises individually coating each of materials and mixing the materials together for use or molding the mixture in the form of pellets.

As another method, there is a method of depositing a geotextile, woven in a mesh form, between layers during construction. Korean Patent No. 10-1427375 discloses an air-permeable polyethylene film for asphalt pavement construction and an asphalt reinforcement comprising the same.

SUMMARY

An object of the present disclosure is to provide an asphalt modifier for an asphalt mixture, which may prevent damage to asphalt pavement, such as plastic deformation, cracks or potholes, and at the same time, may be produced at low cost and with high productivity, and may also reduce construction costs.

The above object is accomplished by an asphalt modifier for an asphalt mixture, the asphalt binder being intended to be mixed with aggregate and an asphalt binder and comprising: a reinforcing fiber bundle having a length of 8 to 34 mm and composed of a plurality of reinforcing fiber strands; and a coating layer forming the envelope of the reinforcing fiber bundle and comprising polyethylene and an inorganic material, the asphalt modifier containing, based on the total weight of the modifier, 1 to 10 wt % of the reinforcing fiber, 55 to 90 wt % of low-density polyethylene, 0.05 to 30 wt % of linear low-density polyethylene, and 0.05 to 5 wt % of the inorganic material.

Preferably, the inorganic material may be at least one selected from the group consisting of calcium carbonate, magnesium carbonate, magnesium sulfate, barium sulfate, magnesium sulfate, zeolite, talc, kaolin, zinc oxide, titanium dioxide, titanium oxide, alumina, aluminum hydroxide, magnesium hydroxide, glass fiber scrap, diatomaceous earth, and clay.

Preferably, the reinforcing fiber may be at least one selected from the group consisting of glass fiber, carbon fiber, basalt fiber, and polyester fiber Preferably, the coating layer may further contain at least one selected from the group consisting of an antioxidant and a UV stabilizer.

In addition, the object of the present disclosure is also accomplished by an asphalt mixture containing the asphalt modifier, aggregate and an asphalt binder.

The asphalt modifier of the present disclosure is produced by forming a coating layer on the outside of the reinforcing fiber bundle using a coating composition prepared by mixing the inorganic material with the polyethylene resins at a predetermined ratio, and thus may be dispersed uniformly in an asphalt mixture during production of the asphalt mixture. In addition to the reinforcing fiber, the inorganic material may also be dispersed in the asphalt mixture, and thus the interlocking force between the aggregate particles and the effect of bridging therebetween may increase, thereby increasing the strength and toughness of the asphalt mixture.

DETAILED DESCRIPTION

Unless otherwise defined, all technical terms used in the present invention have the following definitions and have the meanings as commonly understood by those skilled in the art to which the present invention pertains. In addition, although preferred methods or samples are described herein, those similar or equivalent thereto are included within the scope of the present disclosure.

The term "about" means the amount, level, value, number, frequency, percent, dimension, size, quantity, weight or length which changes by 30, 25, 20, 15, 10, 9, 8, 7, 6, 5, 4, 3, 2 or 1% relative to the referred amount, level, value, number, frequency, percent, dimension, size, quantity, weight or length.

Throughout the present specification, the terms "comprises", "comprising", "contains" and "containing", when not explicitly required in the context, include a stated step or element, or group of steps or elements, but it should be understood that any other step or element, or group of steps or elements, is not excluded.

Figure 1:
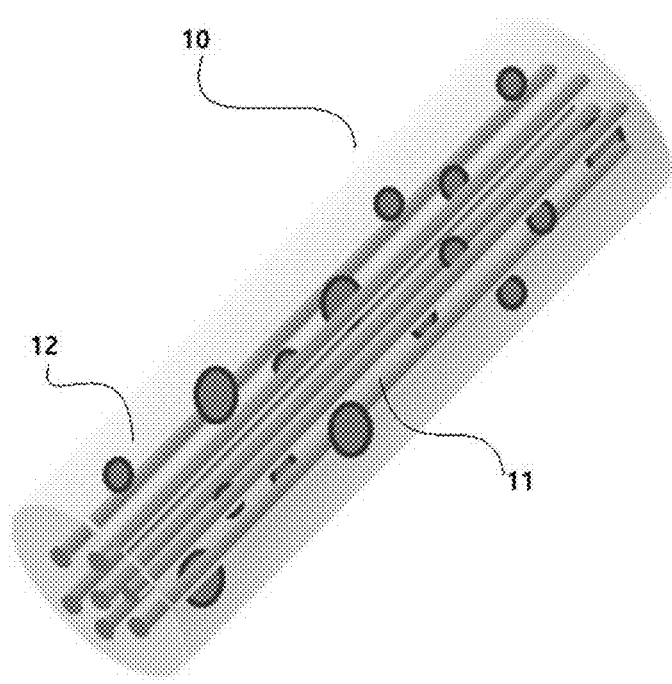
FIG. 1 is a schematic view of an asphalt modifier according to the present disclosure.

The present disclosure is directed to an asphalt modifier that is intended to be mixed with aggregate and an asphalt binder to prepare an asphalt mixture. FIG. 1 is a schematic view of an asphalt modifier 10 according to the present disclosure. Referring to FIG. 1, the asphalt modifier 10 of the present disclosure may comprise a reinforcing fiber bundle 11 and a coating layer 12 forming the envelope of the reinforcing fiber bundle 11.

The reinforcing fiber bundle 11 is composed of a plurality of reinforcing fiber strands. Preferably, the reinforcing fiber bundle 11 may be composed of about 500 to 500,000 reinforcing fiber strands. The reinforcing fiber may be one selected from the group consisting of glass fiber, carbon fiber, basalt fiber and polyester fiber. More preferably, the reinforcing fiber is glass fiber. When the reinforcing fiber is glass fiber, the glass fiber is preferably a continuous fiber having a diameter of 3 to 100 μm, preferably 5 to 50 μm, an alkali content of less than 1%, a specific gravity of 1.8 to 2.6, preferably 2.4 to 2.6, a tensile strength of 500 to 10,000 MPa, preferably 3,000 to 5,000 MPa, and an elongation at break of 0.5 to 15%, preferably 1 to 6%. In addition, the glass fiber bundles preferably have 300 to 4,800 TEX (kg/km).

The reinforcing fiber bundle may be coated with a coating composition, and then cut to a length of 8 to 34 mm, preferably 10 to 20 mm, thus producing the asphalt modifier according to the present disclosure.

The coating layer comprises low-melting polyethylene and an inorganic material. The polyethylene preferably has a melting point of 90 to 130° C. More preferably, the polyethylene that is used in the present disclosure may be low-density polyethylene, linear low-density polyethylene, or a mixture thereof, which a melting point of 120° C. or below.

According to one embodiment of the present disclosure, the coating layer may contain an inorganic material. The inorganic material may be at least one selected from the group consisting of calcium carbonate, magnesium carbonate, magnesium sulfate, barium sulfate, zeolite, talc, kaolin, zinc oxide, titanium dioxide, titanium oxide, alumina, aluminum hydroxide, magnesium hydroxide, glass fiber scrap, diatomaceous earth, and clay.

According to one embodiment of the present disclosure, the coating layer may contain, based on the total weight of the coating layer, 60 to 99 wt % of low-density polyethylene, 0.1 to 39 wt % of linear low-density polyethylene, and 0.1 to 10 wt % of the inorganic material. More preferably, it may contain 65 to 75 wt % of low-density polyethylene, 20 to 30 wt % of linear low-density polyethylene, and 1 to 5 wt % of the inorganic material.

Preferably, the coating layer further contains at least one additive selected from the group consisting of an antioxidant and a UV stabilizer. When two or more additives are used, they may be contained in equal amounts. The additive is preferably contained in an amount of 0.1 to 3 wt %, more preferably 0.2 wt %.

The reinforcing fiber bundle having the coating layer formed thereon may be cut to have a length of 8 to 34 mm, preferably 10 to 20 mm, and the diameter of the final asphalt modifier may be 1 to 10 mm, preferably 2 to 5 mm.

The asphalt modifier of the present disclosure may be produced by the following method.

First, low-density polyethylene, linear low-density polyethylene and the inorganic material are mixed together, and stirred while being heated to a temperature of 160 to 330° C., preferably 200 to 290° C., thereby preparing a coating composition containing powder uniformly dispersed therein. At this time, the coating composition preferably contains, based on the total weight of the coating composition, 60 to 99 wt % of low-density polyethylene, 0.1 to 39 wt % of linear low-density polyethylene, and 0.1 to 10 wt % of the inorganic material.

The coating composition prepared as described above may be impregnated onto the reinforcing fiber bundle, or the outside of the reinforcing fiber bundle may be coated with the coating composition using a coating device.

According to one embodiment of the present disclosure, the coating device comprises: a body unit to which the coating composition is supplied; a nozzle unit connected to the body in a transverse direction and configured to coat the surface of the reinforcing fiber bundle with the coating composition; and a fiber supply unit configured to supply the reinforcing fiber bundle from the rear of the nozzle toward the nozzle unit. When the reinforcing fiber bundle is supplied to the fiber supply unit and passed through the nozzle unit while the coating composition is supplied to the body unit, the coating composition forms a coating layer on the outside of the reinforcing fiber bundle inside the nozzle unit, thereby producing the asphalt modifier of the present disclosure. In this process, the coating composition is preferably supplied in a state heated to a temperature of 160 to 330° C., preferably 200 to 290° C., so that the coating layer is uniformly formed.

The asphalt modifier of the present disclosure may contain, based on the total weight of the modifier, 1 to 10 wt % of the reinforcing fiber, 55 to 90 wt % of low-density polyethylene, 0.05 to 30 wt % of linear low-density polyethylene, and 0.05 to 5 wt % of the inorganic material. More preferably, the asphalt: modifier of the present disclosure may contain, based on the total weight of the modifier, 3 to 8 wt % of the reinforcing fiber, 65 to 85 wt % of low-density polyethylene, 5 to 25 wt % of linear low-density polyethylene, and 1 to 3 wt % of the inorganic material.

The asphalt modifier produced as described above is mixed with aggregate and an asphalt binder in a plant mixer to form an asphalt mixture. The asphalt modifier may be contained in an amount of 0.1 to 10 wt % based on the total weight of the asphalt mixture.

The aggregate that is used in the present disclosure may include, but is not particularly limited to, sand, crushed stone, and gravel. The content of the aggregate in the asphalt mixture may be 50 to 98 wt %, preferably 80 to 95 wt %, based on the total weight of the mixture. Although the thickness of the aggregate is not particularly limited, the aggregate preferably has a maximum coarse aggregate size of 10 to 40 mm and an aggregate particle size distribution corresponding to a 2.5 mm (No. 8) sieve passing rate of 7 to 65 wt %.

The asphalt binder that is used in the present disclosure may be straight asphalt, blown asphalt, or the like, but is not particularly limited thereto. The asphalt binder may be used in an amount of 1 to 30 wt %, preferably 3 to 10 wt %, based on the total weight of the asphalt mixture.

In the process of preparing the asphalt mixture, the asphalt modifier, the aggregate and the asphalt binder are mixed together at the above-described weight ratio, and in this process, the mixture is preferably heated to a temperature of 200 to 330° C. Since the polyethylene resin of the asphalt modifier of the present disclosure has a low melting point, the coating layer of the modifier is melted in the mixing process of preparing the asphalt mixture, and the glass fiber and industrial by-product powder of the modifier are dispersed in the asphalt mixture. Since the polyethylene resin is melted even at a low temperature, the cost of preparing the asphalt mixture is lower than the cost of preparing an asphalt mixture using a thermoplastic resin having a high melting point, such as polypropylene, and thus the polyethylene resin has excellent economic efficiency.

Hereinafter, the present disclosure will be described in detail with reference to Examples. However, the scope of the present disclosure is not limited by these examples.

Production Example 1

As low-density polyethylene, a low-density polyethylene (Hanwha Chemical Corp., Grade 950) having a melt index of 7.7 g/10 min (190° C., 2.16 kg) and a density of 0.919 g/cm$^2$ was used. As linear low-density polyethylene, a linear low-density polyethylene (Hanwha Chemical Corp., Grade 9730) having a melt index of 15.0 g/10 min (190° C., 2.16 kg) and a density of 0.922 g/cm$^2$ was used. As an inorganic material, calcium carbonate (Yabashi Korea, YK-2C) having an average particle size of 2.4 µm was used. As glass fiber, a 1200-Tex glass fiber product among SE4849 glass fiber bundles (Owens Corning Corp.) was used.

In order to produce a coating layer containing polyethylene, 70 wt % of low-density polyethylene, 25 wt % of linear low-density polyethylene, 4 wt % of calcium carbonate, 0.5 wt % of an antioxidant (IRGANOX 1010™, manufactured by Ciba Special Chemical, Inc.), and 0.5 wt % of a UV stabilizer (Chimasorb 119™, manufactured by BASF) were uniformly melt-mixed together, thus preparing a mixed compound. The melting point of the mixed compound was 110° C.

Here, a 65-mm extruder was used. The outside of the glass fiber was coated by passing the glass fiber through the nozzle and melt-extruding the mixture of low-density polyethylene, linear low-density polyethylene and calcium carbonate at 280° C. Thereafter, the coated glass fiber was cut to a size of 15 mm, thereby producing an asphalt modifier. The diameter of the asphalt modifier was 2.1 mm and the content of glass fiber is 5.5 wt %.

Production Example 2

An asphalt modifier was produced in the same manner as in Production Example 1, except that a 2400-Tex glass fiber product among SE4849 glass fiber bundles (Owens Corning Corp.) was used as glass fiber. The diameter of the asphalt modifier was 2.6 mm and the content of glass fiber is 5.5 wt %.

Comparative Production Example 1

An asphalt modifier was produced in the same manner as in Production Example 1, except that a 2200-Tex glass fiber product among SE1200 glass fiber bundles (Owens Corning Corp.) was used as glass fiber and that 40 wt % of low-density polyethylene, 20 wt % of linear low-density polyethylene and 40 wt % of calcium carbonate were uniformly melt-mixed together for production of the coating layer. The diameter of the asphalt modifier was 3.7 mm and the content of glass fiber is 5.0 wt %.

Comparative Production Example 2

An asphalt modifier was produced in the same manner as in Production Example 1, except that 2200-Tex and 4400-Tex glass fiber products among SE1200 glass fiber bundles (Owens Corning Corp.) were used as glass fiber and that 100 wt % of low-density polyethylene was used for production of the coating layer. The diameter of the asphalt modifier was 4.8 mm and the content of glass fiber is 4.5 wt %.

Comparative Production Example 3

An asphalt modifier was produced in the same manner as in Production Example 1, except that 8800-Tex glass fiber products among SE1200 glass fiber bundles (Owens Corning Corp.) were used as glass fiber and that 100 wt % of high-density polyethylene was used for production of the coating layer. The diameter of the asphalt modifier was 9.1 mm and the content of glass fiber is 5.5 wt %

Figure 2:
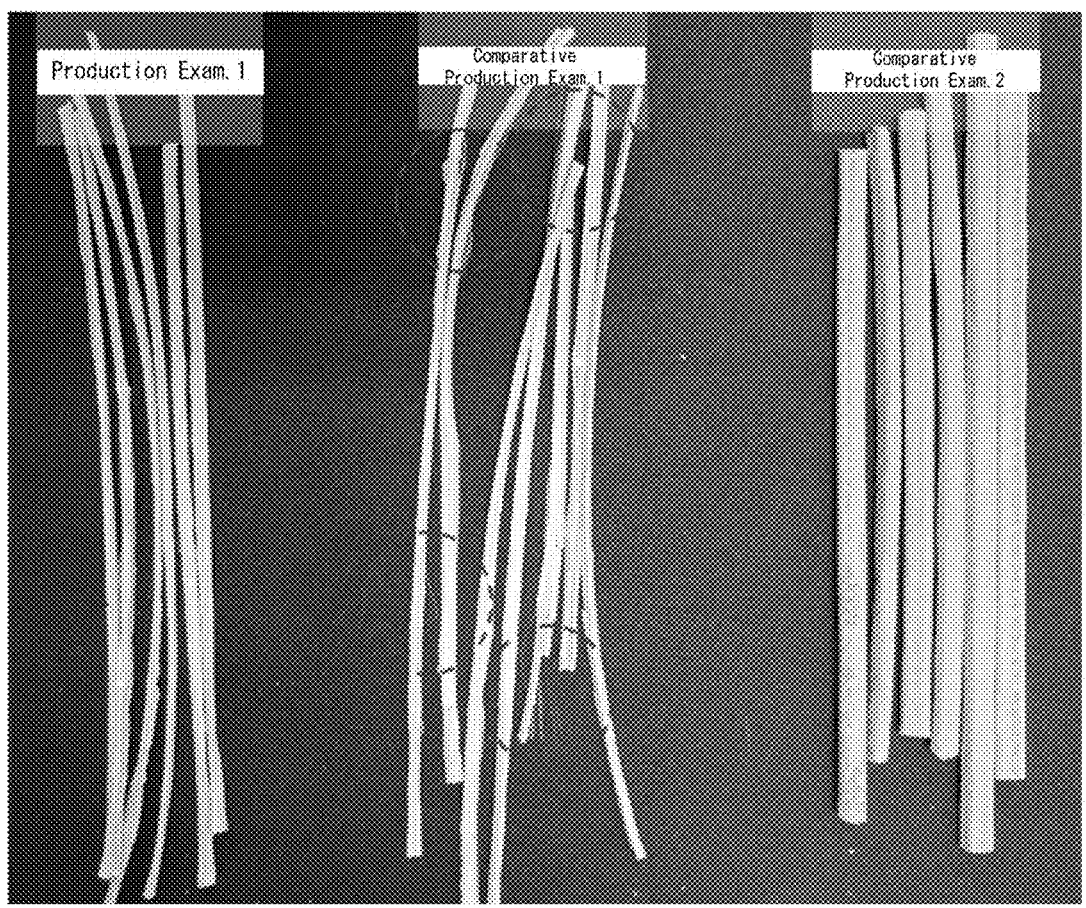
FIG. 2 shows photographs of asphalt modifiers produced in Production Example 2 and Comparative Production Examples 1 and 2 according to the present disclosure.

FIG. 2 shows photographs of the asphalt modifiers produced in Production Example 2 and Comparative Production Examples 1 and 2.

Referring to FIG. 2, in the case of the asphalt modifier of Comparative Production Example 1, the glass fiber strands were exposed because the coating layer was not completely formed due to a high content of the inorganic material. In addition, the asphalt modifier of Comparative Production Example 2 was excessively thick so that it would not be easy to melt and disperse in an asphalt mixture.

Experimental Example

An asphalt mixture for testing was prepared based on WC-2 grade asphalt which is mainly used for a surface layer. In the case of WC-2 grade, several types of aggregate are used. Aggregate was prepared, consisting of a mixture of 4 to 10 wt % of less than 0.08 mm aggregate, 6 to 16 wt % of 0.08 to 0.15 mm aggregate, 5 to 14 wt % of 0.15 to 0.3 mm aggregate, 7 to 17 wt % of 0.3 to 0.6 mm aggregate, 13 to 20 wt % of 0.6 to 2.5 mm aggregate, 13 to 20 wt % of 2.5 to 5 mm aggregate, 7 to 15 wt % of 5 to 10 mm aggregate, and 3 to 8 wt % of 10 to 13 mm aggregate. 92 wt % of the prepared aggregate was mixed with 2.5 wt % of a filler and 5.5 wt % of an asphalt binder, thus preparing a WC-2 grade asphalt mixture. In the WC-2 asphalt mixture, the contents of aggregate particles having different sizes are substantially uniform, and thus the effect of mutual complementation between the aggregate particles is great, which can increase noise resistance and deformation resistance. In addition, the WC-2 asphalt mixture corresponds to an asphalt aggregate mixing ratio which is commonly used (corresponding to the KS standard). The WC-2 grade asphalt mixture satisfies the ISO quality standard when the Marshall stability value is 5,000 N or higher after 50 times compaction are applied thereto.

For evaluation, the following asphalt mixtures were prepared: an asphalt mixture containing 100 parts by weight of the WC-2 grade asphalt mixture and 1.5 parts by weight of the asphalt modifier produced in Production Example 1 (Example 1); an asphalt mixture containing 100 parts by weight of the WC-2 grade asphalt mixture and 1.5 parts by weight of the asphalt modifier produced in Production Example 2 (Example 2); an asphalt mixture containing 100 parts by weight of the WC-2 grade asphalt mixture and 1.5 parts by weight of the asphalt modifier produced in Comparative Production Example 1 (Comparative Example 1); an asphalt mixture containing 100 parts by weight of the WC-2 grade asphalt mixture and 1.5 parts by weight of the asphalt modifier produced in Comparative Production Example 2 (Comparative Example 2); an asphalt mixture containing 100 parts by weight of the WC-2 grade asphalt mixture and 1.5 parts by weight of the asphalt modifier produced in Comparative Production Example 3 (Comparative Example 3). As a control, an asphalt mixture containing no asphalt modifier was prepared. At this time, the mixing time was 2 minutes.

Figure 3:
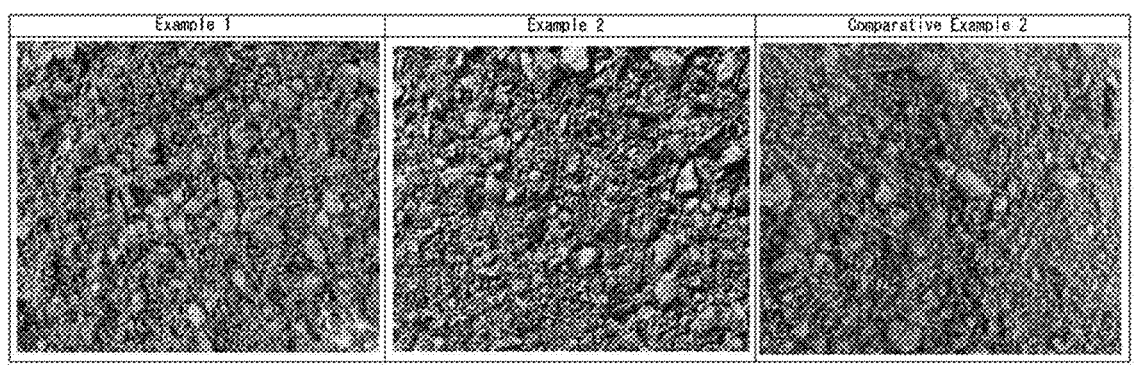
FIG. 3 shows cross-sectional photographs of asphalt mixtures having dispersed therein the asphalt modifier according to the present disclosure.

FIG. 3 shows cross-sectional photographs of the asphalt mixtures of Examples 1 and 2 and Comparative Example 2. Referring to FIG. 3, it can be confirmed that, in the case of Examples 1 and 2, the asphalt modifier was mixed well with the aggregate and dispersed well, but in the case of Comparative Example 2, the asphalt modifier was not well dispersed and was not mixed well with the aggregate.

In addition, the Marshall stability value of each of the asphalt mixtures of the Examples, the Comparative Examples and the control was measured three times. The results of the measurement are shown in Table 1 below.

For the Marshall stability test, a disk-shaped specimen having a diameter of 10 cm (4 in) and a thickness of 6.3 cm (2.5 in) was prepared and a compactor was applied thereto 50 times, and then the specimen was erected vertically and inserted between two arc-shaped bearing plates. A load was applied to the specimen at a constant speed of 50 mm (2 in) for 1 minute, and the maximum load value that appeared until the specimen was destroyed was calculated as a Marshall stability value. The test temperature was 60° C.

TABLE 1

| | | Aggregate content (wt %) | Filler content (wt %) | Asphalt binder content (wt %) | Modifier content (wt %) | Marshall stability (N) |
|---|---|---|---|---|---|---|
| Example 1 | 1-1 | 92 | 2.5 | 5.5 | 1.5 parts by weight | 12,351 |
| | 1-2 | | | | | 12,697 |
| | 1-3 | | | | | 12,914 |
| Average | | | | | | 12,654.0 |
| Example 2 | 2-1 | | | | 1.5 parts by weight | 11,544 |
| | 2-2 | | | | | 13,038 |
| | 2-3 | | | | | 11,034 |
| Average | | | | | | 11,872 |
| Control | 1-1 | | | | 0 | 7,776 |
| | 1-2 | | | | | 7,090 |
| | 1-3 | | | | | 7,351 |

TABLE 1-continued

| | | Aggregate content (wt %) | Filler content (wt %) | Asphalt binder content (wt %) | Modifier content (wt %) | Marshall stability (N) |
|---|---|---|---|---|---|---|
| Average | | | | | | 7,405.7 |
| Comparative Example 1 | 1-1 | | | | 1.5 parts by weight | 7,520 |
| | 1-2 | | | | | 7,856 |
| | 1-3 | | | | | 7,839 |
| Average | | | | | | 7,738.3 |
| Comparative Example 2 | 2-1 | | | | 1.5 parts by weight | 8,501 |
| | 2-2 | | | | | 8,295 |
| | 2-3 | | | | | 8,153 |
| Average | | | | | | 8,316.3 |
| Comparative Example 3 | 3-1 | | | | 1.5 parts by weight | 7,350 |
| | 3-2 | | | | | 7,156 |
| | 3-3 | | | | | 7,463 |
| Average | | | | | | 7,323 |

Referring to Table 1 above, Examples 1 and 2 showed average Marshall stability values of 12,654 and 11,872, respectively, which were higher than the average Marshall stability values of the control or Comparative Examples 1 and 2. Especially, Comparative Example 3 showed lowest average Marshall stability value of 7,323.

In addition, the dynamic stability properties of the prepared asphalt mixtures of Example 2 and Comparative Example 2 were measured. The dynamic stability properties were measured in accordance with the KS standard [KS F 2374], and the results of the measurement are shown in Table 2 below.

TABLE 2

| | | | Dynamic stability (times/min) |
|---|---|---|---|
| Example 2 | (Production Example 2) | #1 | 63,000 |
| | | #2 | 63,000 |
| | | Average | 63,000 |
| Comparative Example 2 | (Comparative Production Example 2) | #1 | 21,000 |
| | | #2 | 21,000 |
| | | Average | 21,000 |
| Comparative Example 3 | (Comparative Production Example 3) | #1 | 27,000 |
| | | #2 | 21,000 |
| | | Average | 24,000 |
| No modifier was applied (general Ascon mixture) | Control | #1 | 6,300 |
| | | #2 | 7,875 |
| | | Average | 7,088 |

Referring to Table 2 above, the dynamic stability of Example 2 containing the asphalt modifier according to the present disclosure was significantly superior to those of Comparative Examples 2 and 3 and the general asphalt mixture.

Although the present disclosure has been described in detail with reference to the specific features, it will be apparent to those skilled in the art that this description is only of a preferred embodiment thereof, and does not limit the scope of the present disclosure. Thus, the substantial scope of the present disclosure will be defined by the appended claims and equivalents thereto.

What is claimed is:

1. An asphalt modifier for an asphalt mixture, the asphalt modifier being intended to be mixed with an aggregate and an asphalt binder, the asphalt modifier comprising:
 a reinforcing fiber bundle of 1 to 10 wt % based on a total weight of the asphalt modifier, the reinforcing fiber bundle having a length of 8 to 34 mm and composed of a plurality of reinforcing fiber strands, wherein the reinforcing fiber bundle is a glass fiber bundle having 300 to 4,800 TEX (kg/km); and a coating layer comprising low-density polyethylene of 55 to 90 wt %, linear low-density polyethylene of 0.05 to 30 wt %, an inorganic material of 0.05 to 5 wt %, based on the total weight of the asphalt modifier, respectively, and at least one selected from the group consisting of an antioxidant and a UV stabilizer, the coating layer forming an envelope of the reinforcing fiber bundle, the low-density polyethylene and the linear low-density polyethylene having a melting point of 90 to 130° C., wherein the inorganic material includes at least one selected from the group consisting of calcium carbonate, magnesium carbonate, magnesium sulfate, barium sulfate, zeolite, talc, kaolin, zinc oxide, titanium dioxide, titanium oxide, alumina, aluminum hydroxide, magnesium hydroxide, glass fiber scrap, diatomaceous earth, and clay.

2. The asphalt modifier of claim 1, wherein the asphalt modifier has a diameter of 2 to 5 mm.

3. An asphalt mixture containing: the asphalt modifier of claim 1; aggregate; and an asphalt binder.

\* \* \* \* \*